(12) United States Patent
Bingham et al.

(10) Patent No.: US 8,309,049 B2
(45) Date of Patent: Nov. 13, 2012

(54) MOLTEN METAL REACTOR AND METHOD OF FORMING HYDROGEN, CARBON MONOXIDE AND CARBON DIOXIDE USING THE MOLTEN ALKALINE METAL REACTOR

(75) Inventors: Dennis N. Bingham, Idaho Falls, ID (US); Kerry M. Klingler, Idaho Falls, ID (US); Terry D. Turner, Idaho Falls, ID (US); Bruce M. Wilding, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 421 days.

(21) Appl. No.: 12/581,656

(22) Filed: Oct. 19, 2009

(65) Prior Publication Data
US 2011/0089377 A1  Apr. 21, 2011

(51) Int. Cl.
- *C01B 31/18* (2006.01)
- *C01B 31/20* (2006.01)
- *C01B 3/24* (2006.01)

(52) U.S. Cl. .......... 423/418.2; 423/437.1; 423/650; 423/652

(58) Field of Classification Search .......... 252/373; 423/650, 651, 652, 653, 654, 418.2, 437.1
See application file for complete search history.

(56) References Cited

U.S. PATENT DOCUMENTS

| | | | |
|---|---|---|---|
| 2,754,187 A * | 7/1956 | Bond, Jr. et al. | 48/127.5 |
| 3,252,774 A | 5/1966 | McMahon et al. | |
| 3,505,018 A | 4/1970 | Bawa et al. | |
| 3,786,138 A * | 1/1974 | Shalit et al. | 423/650 |
| 3,975,913 A * | 8/1976 | Erickson | 60/645 |
| 4,017,271 A * | 4/1977 | Barclay et al. | 48/197 R |
| 4,092,236 A | 5/1978 | Heredy | |
| 4,216,199 A * | 8/1980 | Erickson | 423/657 |
| 5,298,233 A | 3/1994 | Nagel | |
| 5,695,732 A * | 12/1997 | Sparks et al. | 423/418.2 |
| 5,728,464 A | 3/1998 | Checketts | |
| 5,817,157 A | 10/1998 | Checketts | |
| 5,832,845 A | 11/1998 | Wagner | |
| 6,195,382 B1 | 2/2001 | Wagner | |
| 6,221,310 B1 | 4/2001 | Checketts et al. | |
| 6,227,126 B1 | 5/2001 | Wagner | |
| 6,235,235 B1 | 5/2001 | Checketts | |
| 6,997,012 B2 | 2/2006 | Zollinger et al. | |
| 7,078,012 B2 | 7/2006 | Bingham et al. | |
| 7,153,489 B2 | 12/2006 | Bingham et al. | |
| 7,294,323 B2 | 11/2007 | Klingler et al. | |
| 7,449,156 B2 | 11/2008 | Wagner | |
| 7,481,992 B2 * | 1/2009 | Reichman et al. | 423/648.1 |
| 7,588,676 B2 * | 9/2009 | Reichman et al. | 205/637 |

* cited by examiner

*Primary Examiner* — Wayne Langel
(74) *Attorney, Agent, or Firm* — TraskBritt

(57) ABSTRACT

A molten metal reactor for converting a carbon material and steam into a gas comprising hydrogen, carbon monoxide, and carbon dioxide is disclosed. The reactor includes an interior crucible having a portion contained within an exterior crucible. The interior crucible includes an inlet and an outlet; the outlet leads to the exterior crucible and may comprise a diffuser. The exterior crucible may contain a molten alkaline metal compound. Contained between the exterior crucible and the interior crucible is at least one baffle.

6 Claims, 8 Drawing Sheets

MOLTEN METAL REACTOR AND METHOD OF FORMING HYDROGEN, CARBON MONOXIDE AND CARBON DIOXIDE USING THE MOLTEN ALKALINE METAL REACTOR

GOVERNMENT RIGHTS

This Invention was made under a Cooperative Research and Development Agreement between Western Hydrogen, LLC and Battelle Energy Alliance, LLC under Contract No. DE AC05ID14517, awarded by the U.S. Department of Energy. The U.S. Government has certain rights in the invention.

FIELD OF THE INVENTION

The present invention relates to a molten metal reactor and, more particularly, to a molten metal reactor capable of producing hydrogen, carbon monoxide, and carbon dioxide gases from a carbon based material. The present invention also relates to a method of forming hydrogen, carbon monoxide, and carbon dioxide gases using the molten metal reactor of the present invention.

BACKGROUND OF THE INVENTION

Methods of converting carbon materials and steam into hydrogen, carbon monoxide and carbon dioxide gases using a molten metal compound are known in the art and described in, for example, U.S. Pat. No. 3,252,774 to McMahon et al. and entitled Production of Hydrogen-Containing Gasses, incorporated herein by reference. Briefly, a carbon material and steam are brought into contact with a molten metal compound within a molten metal reactor. When the carbon material and steam are contacted with the molten metal compound, the carbon material and steam are converted to a gas comprising carbon monoxide, carbon dioxide, and hydrogen. Any metals or impurities within the liquid hydrocarbon may be trapped within the molten metal compound.

A consistent issue with molten metal reactors is providing the necessary contact time between the carbon material to be reacted and the molten metal compound. As such, molten metal reactors may be long and contain a substantial quantity of the molten metal compound and it may be costly to heat and maintain the molten metal compound at the desired temperature. Another problem common with molten metal reactors is the product gas stream may comprise some of the molten metal compound. Any molten metal compound in the product gas stream may damage and corrode equipment and piping in processing the product gas stream.

Accordingly, there exists a need for a molten metal reactor which provides the necessary contact time for converting the carbon material to the gas product stream and also produces a product gas stream free of molten metal.

BRIEF SUMMARY OF THE INVENTION

The present invention relates to a molten metal reactor and a method of forming a product gas stream comprising hydrogen, carbon monoxide, and carbon dioxide using the molten metal reactor. In specific embodiments, the molten metal reactor includes an interior crucible member contained within an exterior crucible member. The interior crucible member has an inlet for accepting a feed and an outlet comprising a diffuser. Contained between the interior crucible member and the exterior crucible member is at least one baffle. In some embodiments, a filter is also contained between the interior crucible member and the exterior crucible member. The exterior crucible member includes a vent for venting a product gas. In further embodiments, the reactor includes a molten salt contained between the interior crucible member and the exterior crucible member. In still further embodiments, an ion control screen is also contained between the interior crucible member and the exterior crucible member.

The present invention also relates to a method of forming a product gas stream comprising hydrogen, carbon monoxide, and carbon dioxide using the molten metal reactor of the present invention. The method includes feeding a feed stream comprising a carbon material and steam into the interior crucible member. The feed stream is diffused through the diffuser at the interior crucible outlet forming vapor bubbles of the feed stream within the molten alkaline metal compound contained between the interior crucible member and the exterior crucible member. The vapor bubbles react within the molten metal forming a gas comprising hydrogen, carbon monoxide, and carbon dioxide. The vapor bubbles pass through the at least one baffle or travel around the at least one screen baffle to increase the residence time of the vapor bubbles within the molten alkaline metal compound. Upon reaching the surface of the molten alkaline metal compound, the vapor bubbles release a gas comprising hydrogen, carbon monoxide, and carbon dioxide. In some embodiments, the gas passes through the filter for removing any of the molten alkaline metal compound from the gas and then the gas exits through the vent. In further methods, after the gas passes through the filter, the gas passes through an ion control screen for further removing any of the molten alkaline metal compound in the gas.

BRIEF DESCRIPTION OF THE DRAWINGS

While the specification concludes with claims particularly pointing out and distinctly claiming that which is regarded as the present invention, the advantages of this invention may be more readily ascertained from the following description of the invention when read in conjunction with the accompanying drawings in which:

DETAILED DESCRIPTION OF THE INVENTION

Some of the illustrations presented herein are not meant to be actual views of any particular material, device, or system, but are merely idealized representations which are employed to describe the present invention. Additionally, elements common between figures may retain the same numerical designation.

The present invention generally relates to a molten metal reactor and a method of converting a carbon material and steam into a gas comprising hydrogen, carbon monoxide, and carbon dioxide using the molten metal reactor.

Figure 1:
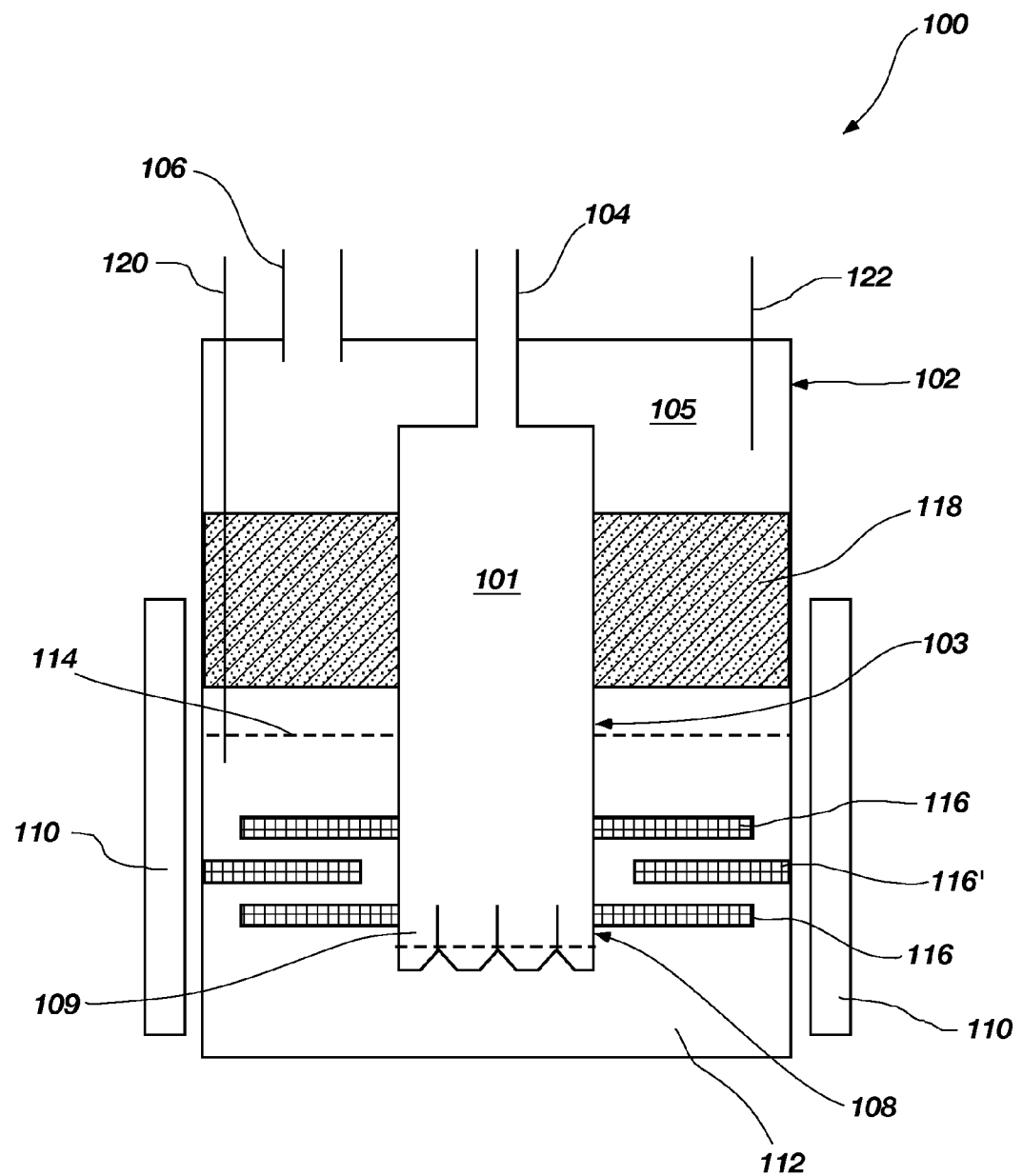
FIGS. 1 through 3 are simplified schematics of a molten metal reactor of the present invention.

FIG. 1 illustrates a cross-section of one embodiment of a molten metal reactor 100 of the present invention. The molten metal reactor 100 comprises two chambers including an inner chamber 101 and an outer chamber 105. The inner chamber 101 is defined by the area inside an interior crucible member 103, and the outer chamber 105 is defined by an area between an exterior crucible member 102 and the interior crucible member 103. The interior crucible member 103 is entirely contained within the exterior crucible member 102 except for an inlet 104 to the inner chamber 101 which extends outside of the exterior crucible member 102. The inlet 104 is suitable for directing a feed material into the inner chamber 101. The exterior crucible member 102 includes a vent 106 suitable for directing a product gas from the molten metal reactor 100 to a suitable treatment means, such as a gas separator, not shown, for treating the gases formed by the method of the invention. The shape of the interior crucible member 103 and the exterior crucible member 102 may be any geometrical shape, such as, for example, a cylinder, a square, or a polygon.

The interior crucible member 103 further includes an outlet 108 providing fluid communication between the inner chamber 101 and the outer chamber 105. The outlet 108 may comprise a diffuser 109. The diffuser 109 is provided to control the rate at which liquids and vapors enter the outer chamber 105 from the inner chamber 101. In some embodiments, as described in more detail below, liquids and vapors may travel through the diffuser 109 into a molten alkaline metal compound 112. A surface 114 of the molten alkaline metal compound is depicted by a dashed line 114. The diffuser 109 helps control the size of vapor bubbles 204 (FIG. 4) that form in the molten alkaline metal compound 112 and also helps to prevent fluctuations in the surface 114 of the molten alkaline metal compound 112. The diffuser 109 may comprise, for example, a graduated arrangement of inverted weirs and slits, or a series of holes near the bottom of the inner chamber 101.

Contained within the outer chamber 105 is at least one baffle 116, 116'. In one embodiment, as depicted in FIG. 1, the at least one baffle 116, 116' includes first and third baffles 116 extending from the exterior surface of the interior crucible member 103 toward the outer crucible member 102 leaving a gap between the first and third baffles 116 and the exterior crucible member 102. A second baffle 116' extends from the exterior crucible member 102 toward the interior crucible member 103 leaving a gap between the second baffle 116' and the first crucible member 103. The second baffle 116' is positioned between the first and third baffles 116. While FIG. 1 illustrates three baffles 116, 116', it is understood that any number of baffles 116, 116' may be utilized. The baffles 116, 116' prevent large vapor bubbles 204 (FIG. 4) from passing directly through the molten alkaline metal compound 112. As such, large vapor bubbles 204 (FIG. 4) will either be broken into smaller vapor bubbles when contacting the baffle 116, 116', or the vapor bubbles will have to travel around the serpentine path created by the baffles 116, 116' thus increasing the residence time of the larger vapor bubbles 204 (FIG. 4) within the molten alkaline metal compound 112. The baffles 116, 116' may comprise, for example, metal plates or screens. In an embodiment where the baffles 116, 116' comprise screen baffles, the size of the screens may be small enough so that the vapor bubbles 204 (FIG. 4) capable of passing through the screens will require only the time of passing through the screens to reach the desired rate of conversion within the molten alkaline metal compound 112. In a further embodiment, the sizes of the screen of the baffles 116, 116' may be staggered such that screen size of the first screen baffle is larger than the second screen baffle and the screen size of the second screen baffle is larger than the third screen baffle. For example, the first screen baffle may have a screen size of between about 3000 microns and about 5000 microns. The second screen baffle may have a screen size of between about 900 microns and 2000 microns. The third screen baffle may have a screen size of between about 500 microns and 800 microns. Staggering the sizes of the screen of the baffles 116, 116' will help to break up the vapor bubbles 204 (FIG. 4) and decrease the size of the vapor bubbles 204 as they travel through molten alkaline metal compound 112.

In some embodiments, also contained within the outer chamber 105 is a filter 118. The filter 118 may be provided to remove the molten alkaline metal compound 112 from gas produced within the molten alkaline metal compound 112. As the vapor bubbles 204 (FIG. 4) rise to the surface 114 of the molten alkaline metal compound 112, the bubbles 204 (FIG. 4) may burst releasing fine droplets of the molten alkaline metal compound 112 within the gas. The filter 118 catches and entrains the molten alkaline metal compound 112 droplets and allows the molten alkaline metal compound 121 to drain back to the surface 114 of the molten alkaline metal compound 112 while allowing the gas, free of the molten alkaline metal compound 112, to pass through the filter 118. The filter 118 may comprise, for example, a splash limiter or guard, or a traditional filtering means, such as a coalescing filter.

The molten metal reactor 100 may also include a heater 110 positioned adjacent to and/or surrounding the exterior crucible member 102. The heater 110 provides heat to the molten alkaline metal compound 112 to maintain the molten alkaline metal compound 112 in a molten state. Additionally, heat sensors, such as thermocouples 120, 122 may be positioned within the outer chamber 105 for measuring the temperature therein. For example, thermocouple 120 may be positioned to measure the temperature within the molten alkaline metal compound 112, and thermocouple 122 may be positioned to measure the temperature of the gas after passing through the filter 118.

Figure 2:
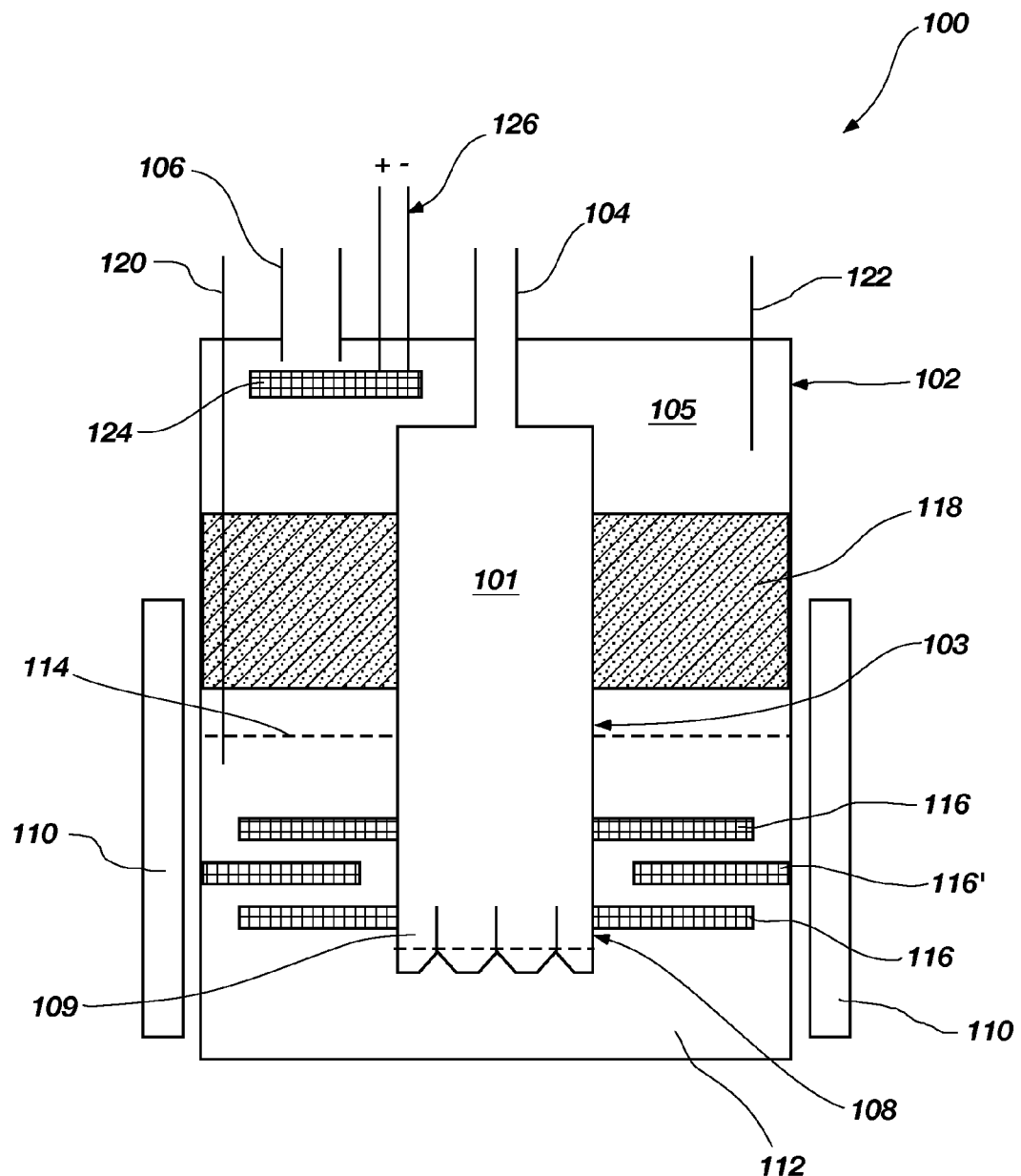

In further embodiments, as illustrated in FIG. 2, the molten metal reactor 100 may also include an ion control screen 124 within the outer chamber 105. The ion control screen 124 is provided to further reduce and/or eliminate the migration of molten alkaline metal compound ions out of the molten metal reactor 100. An electric potential of between about 0.5 VDC and 12 VDC may be supplied to the ion control screen 124. The optimal voltage for the ion control screen 124 may depend on the temperature, pressure, and gas flow rates within the molten metal reactor 100. Lines 126 represent the voltage supplier to the ion control screen 124. Any molten alkaline metal compound ions remaining in the product gas will be trapped in the ion control screen 124 while the product gas passes through the ion control screen 124 and exits the molten metal reactor 100.

Figure 3:
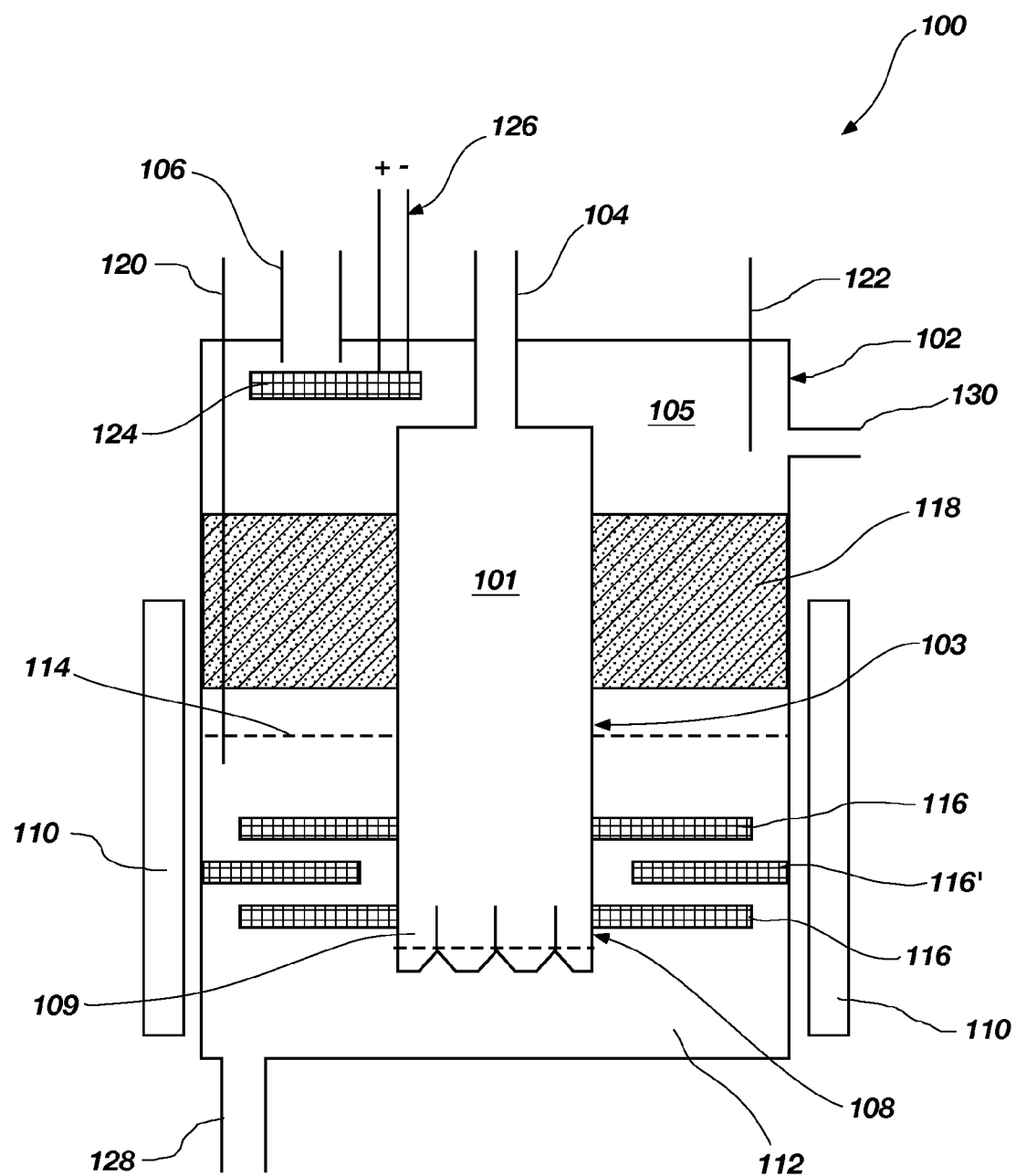

In still further embodiments, as illustrated in FIG. 3, the molten metal reactor 100 may include an exterior crucible outlet 128. The exterior crucible outlet 128 provides a means for removing and/or inputting the molten alkaline metal compound 112 into the molten metal reactor 100. Periodically, the molten alkaline metal compound 112 may need to be processed to remove compounds trapped within the molten alkaline metal compound 112. Exterior crucible outlet 128 provides a means for removing the molten alkaline metal compound 112 for processing and then returning the processed molten alkaline metal compound 112 to the molten metal reactor 100. The molten metal reactor 100 may also include an exterior crucible inlet 130. The exterior crucible inlet 130 provides a means for inputting additional steam or other desirable reactants into the molten metal reactor 100. If any excess reactants, such as carbon, are present in the product gas, steam or oxygen may be added through exterior crucible inlet 130 to oxidize the excess carbon.

As previously mentioned, in some embodiments, a molten alkaline metal compound 112 may be provided within the outer chamber 105 of the molten metal reactor 100. The molten alkaline metal compound 112 may be suitable for decomposing or pyrolyzing a carbon material into elemental carbon, while also facilitating the oxidation of the carbon with the steam to form a gas comprising hydrogen, carbon monoxide, and carbon dioxide according to the following reactions:

$$C+H_2O \rightarrow CO+H_2 \qquad \text{Reaction 1}$$

$$CO+H_2O \rightarrow CO_2+H_2 \qquad \text{Reaction 2}$$

All components that come in contact with the molten alkaline metal compound 112, such as the interior crucible member 103, the exterior crucible member 102, and the baffles 116, 116' are either formed from a material which is resistant to damage from the molten alkaline metal compound 112 or coated with such a protective material.

The molten alkaline metal compound 112 may comprise a mixture of alkali metal carbonates and hydroxides. Typical examples of suitable alkali metal compounds are admixtures of: sodium carbonate and sodium hydroxide; potassium carbonate and sodium hydroxide; sodium carbonate and potassium carbonate; sodium carbonate and lithium carbonate; sodium carbonate and potassium hydroxide; sodium carbonate and sodium nitrate; as well as admixtures of more than two compounds, such as mixtures of the carbonates of sodium, potassium, and lithium, and mixtures of sodium carbonate, sodium hydroxide, and lithium carbonate.

The temperature of the molten alkaline metal compound 112 may be in the range of 400° C. to 1200° C. The preferred temperature of the molten alkaline metal compound 112 will depend on the components comprising the molten alkaline metal compound 112. For example, if the molten alkaline metal compound 112 comprises a mixture of sodium carbonate and sodium hydroxide, the preferred temperature may be about 500° C. to about 950° C. The heater 110 may be adjusted to control the temperature of the molten alkaline metal compound 112. The heater may be capable of temperatures from, for example, 0° C. to 1900° C. on the outside of the exterior crucible member 102. More specifically, the heater 110 may operate at, for example, 600° C. to 1100° C. to maintain the molten alkaline metal compound 112 within the exterior crucible member 102 at a temperature between about 500° C. and about 950° C. The operating temperature of the heater 110 will be dependent on the material, thickness, and size of the exterior crucible member 102.

The molten metal reactor 100 of the present invention may be used to convert any feed comprising a carbon material and steam into a gas comprising hydrogen, carbon monoxide, and carbon dioxide. The carbon material may comprise any normally liquid hydrocarbons or gaseous hydrocarbons. The term "normally liquid hydrocarbons" as used herein includes hydrocarbons whose atmospheric pressure boiling points are greater than about 38° C. and includes naturally occurring petroleum oils, fractions thereof produced during refining operations, and individual hydrocarbons. Thus, the carbon-based material may include acyclic and alicyclic aliphatic hydrocarbons and aromatics such as pentanes, pentenes, hexanes, heptanes, cyclohexanes, benzene, toluene, xylenes, napthalenes, and mixtures thereof. The molten metal reactor 100 is especially valuable for the conversion of various normally liquid or liquid-containing petroleum fractions from light to heavy oils and tars. In one embodiment, the carbon-based material may comprise vacuum residual, a heavy, low-valued carbon material formed as a byproduct of the petroleum upgrade process. While the exact composition of the vacuum residual may vary based on the specifications of the petroleum upgrade process, the vacuum residual may typically comprise carbon, hydrogen, sulfur and trace elements. For example, the vacuum residual may have a composition of approximately 86% carbon, 10% hydrogen, and less than 4% sulfur. Additional examples of the carbon-based material include gas oils including straight run gas oil, thermally cracked gas oil and heavy gas oil, cycle oils such as fluid catalytically cracked cycle oil, light naptha, heavy naptha, straight run gasoline, kerosene, diesel oil, whole crude and residual fractions, such as reduced crude. The carbon-based material may further include, for example, shale oil, tar sand oil, asphalt tar and other liquid-containing heavy or viscous materials, including petroleum waste fractions.

Figure 4:
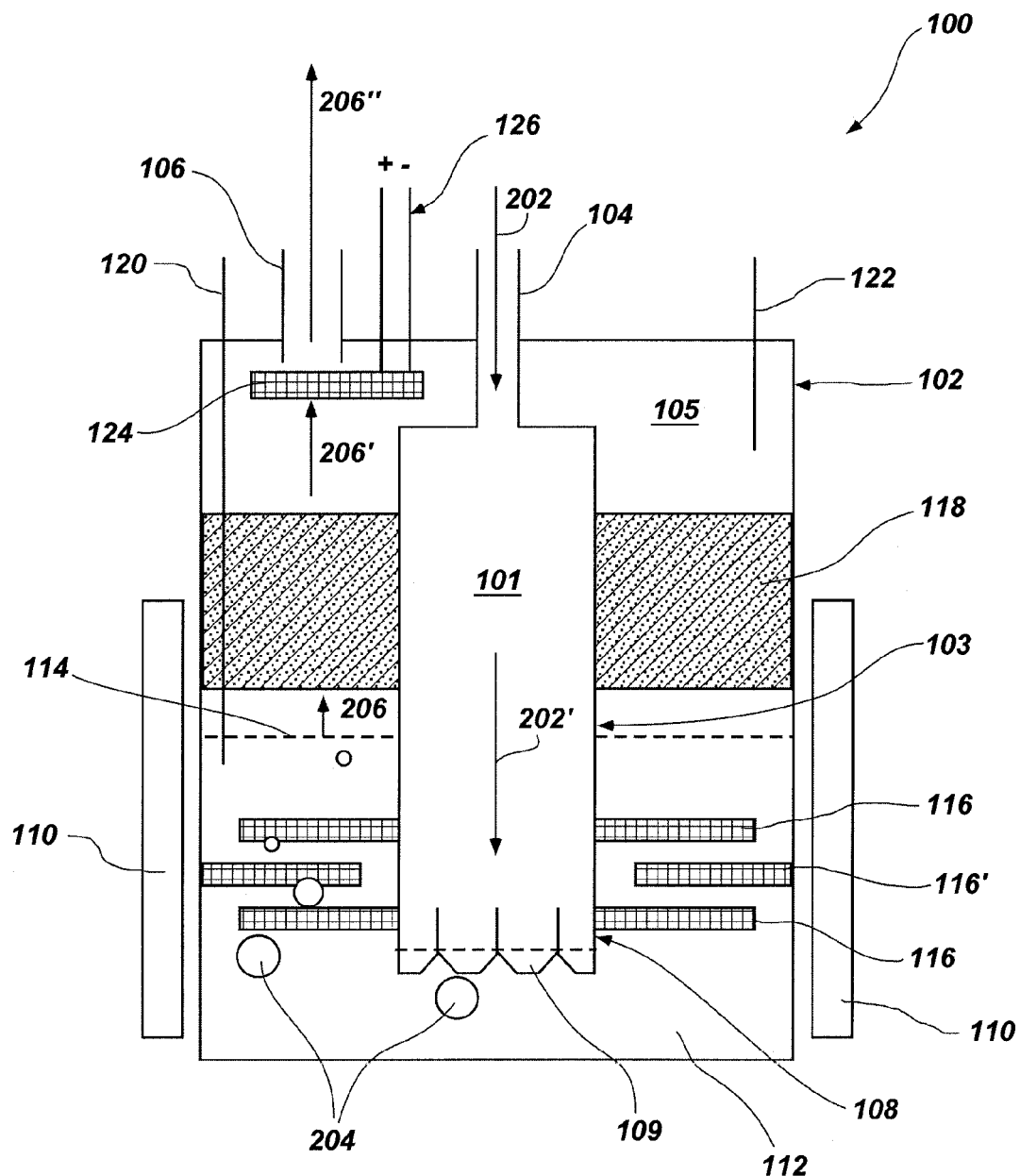
FIG. 4 is a schematic representation of a method of using the molten metal reactor of the present invention.

FIG. 4 illustrates one method of forming a gas 206 comprising hydrogen, carbon monoxide and carbon dioxide using the molten metal reactor 100 of the present invention. A feed stream 202 comprising a carbon material and steam is fed into the inlet 104. The feed stream 202 may be continuously fed into the inlet 104 or the feed stream 202 may be fed into the inlet 104 in batches. The carbon material in the feed stream 202 may be fed to the inlet 104 as a viscous liquid. The feed stream 202 may also be pressurized before being fed to the inlet 104. After the feed stream 202 is fed into the inlet 104, the carbon material mixes with the steam in the inner chamber 101 forming a mixed feed stream 202'. The steam and the heat from the molten alkaline metal compound 112 surrounding the inner chamber 101 may vaporize all or portions of the carbon material, such as for example, volatile components which may be present in the carbon material. The mixed feed stream 202' exits the inner chamber 101 through the diffuser 109 and contacts the molten alkaline metal compound 112. As the mixed feed stream 202' contacts the molten alkaline metal compound 112, the mixed feed stream 202' may form vapor bubbles 204 within the molten alkaline metal compound 112. The diffuser 109 helps to limit the size of the vapor bubbles 204 that enter the alkaline metal salt 112. Additionally, the diffuser helps to maintain the surface 114 of the alkaline metal salt 112 at a steady level. As the vapor bubbles 204 pass through the molten alkaline metal 112, the molten alkaline metal 112 acts as a catalyst and/or pyrolyzing agent and the feed material reacts forming a gas comprising hydrogen, carbon monoxide, and carbon dioxide. Any impurities in the carbon material, such as, for example, sulfur, may be trapped within the molten alkaline metal compound 112. As the vapor bubbles 204 pass through the molten alkaline metal 112 they will contact the baffles 116, 116'. The vapor bubbles 204 will travel around the path formed by the baffles 116, 116'. This extended path formed by the baffles 116, 116' increases the residence time of larger vapor bubbles 204 within the molten alkaline metal compound 112, thus providing more time for the vapor bubbles 204 to react. The molten metal reactor 100 may be designed such that the residence time created by the baffles 116, 116' provides a residence time long enough for a desired conversion of the carbon material and steam. This residence time may range from fractions of a second to tens of seconds or longer. As the vapor bubbles 204 reach the surface 114 of the molten alkaline metal compound 112, the vapor bubbles 204 may burst releasing a gas 206 comprising hydrogen gas, carbon monoxide, and carbon dioxide. Fine droplets of the molten alkaline metal compound 112 may also be in the gas 206. In some embodiments, the gas 206 passes through the filter 118 where the droplets of the alkaline metal compound 112 are trapped. The droplets of the molten alkaline metal compound 112 may drain from the filter 118 back to the surface 114 of the molten alkaline metal compound 112. The filtered gas 206', having the molten salt removed, exits the filter 118. The filtered gas 206' may then be removed from the molten metal reactor 100 via the vent 106. In further embodiments, once the filtered gas 206' passes through the filter 118, the gas filtered 206' may pass through the ion control screen 124 where any remaining alkaline metal ions in the filtered gas 206' are removed, forming screened gas 206''. Screened gas 206'' may then be removed from the molten metal reactor 100 via vent 106.

Figure 5:
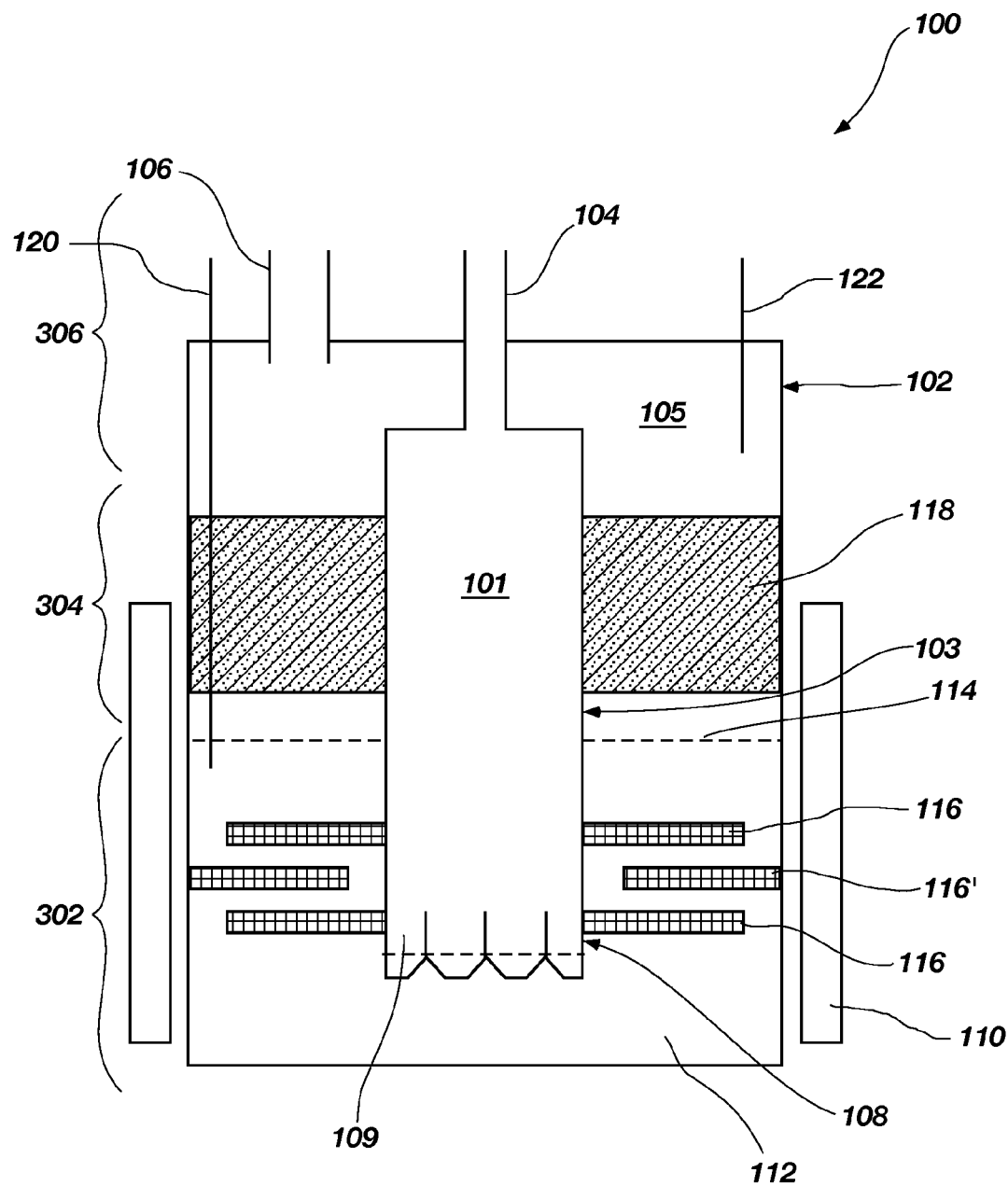
FIG. 5 is a schematic representation of a molten metal reactor of the present invention illustrating three temperature zones of the molten metal reactor.

In some embodiments, as illustrated in FIG. 5, the molten metal reactor 100 may be separated into three or more temperature zones: first zone 302, second zone 304, and third zone 306. The first zone 302 may also be referred to as the "reaction zone" and includes the area in the outer chamber 105 comprising the molten alkaline metal compound 112. The second zone 304 may also be referred to as the "separation zone" and includes the area in the outer chamber comprising the filter 118. Finally, the third zone 306 may also be referred to as the "exit zone" and may include the area of the outer chamber 105 from the filter 118 to the vent 106 and, additionally, may include piping and systems that may be connected to the vent 106. The temperature of the first zone 302 may be the highest temperature of the three zones, followed by the second zone 304, and then the third zone 306.

Figure 6:
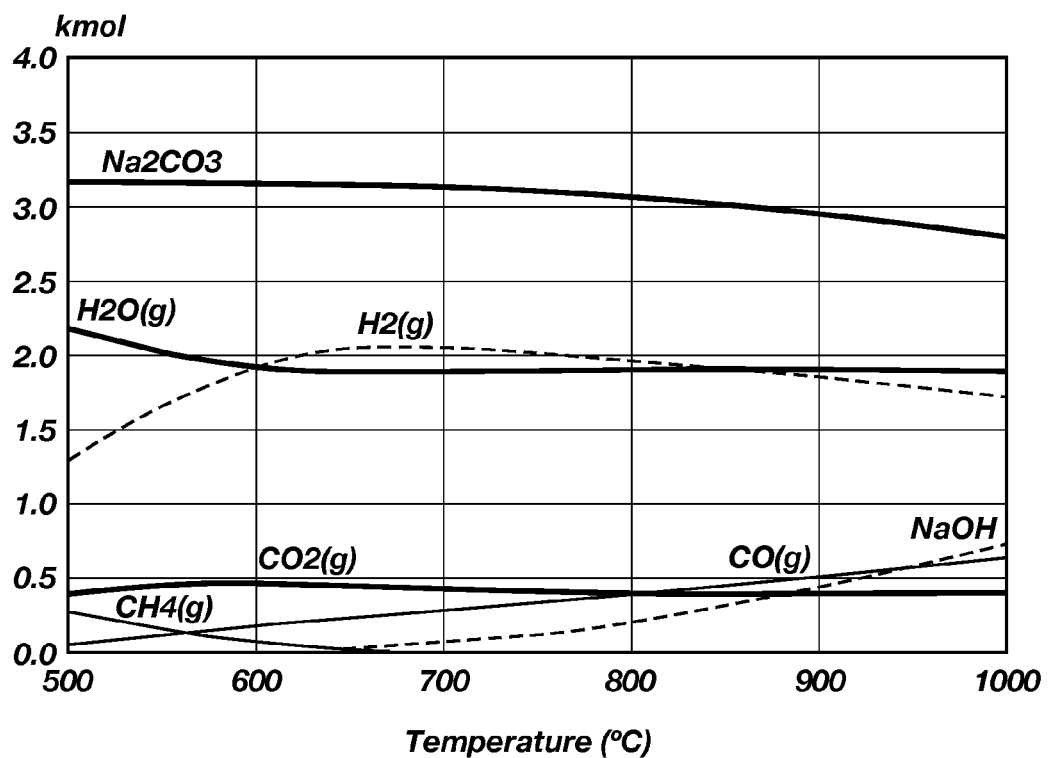
FIG. 6 is a graph representing an example of equilibrium conditions versus temperature of the first temperature zone in the molten metal reactor of the present invention.

FIG. 6 is a graph representing one example of equilibrium conditions versus temperature for the first zone 302. For this example, the feed stream 202 (FIG. 4) comprises vacuum residual and water. More specifically, the feed stream 202 may comprise 0.60 kmol $H_2(g)$, 3.3 kmol $H_2O(g)$, 0.86 kmol C, and 0.015 kmol S. The molten alkaline metal compound 112 comprises a mixture of sodium hydroxide and sodium carbonate. More specifically, the molten alkaline metal compound 112 comprises 3.00 kmol $Na_2CO_3$ and 0.34 kmol NaOH. The temperature of the first zone 302 may be about 900° C. and the pressure 1.0 bar. The temperature and pressure of the first zone 302 are chosen so that the molten alkaline metal compound 112 is a liquid phase. FIG. 6 illustrates the equilibrium conditions within the first zone 302 after the feed stream 202 is reacted with the molten alkaline metal compound 112 at varying temperatures. At 900° C., for example, the equilibrium compositions are $5.7 \times 10^{-5}$ kmol $CH_4(g)$, 0.506 kmol CO(g), 0.40 kmol $CO_2(g)$, 1.86 kmol $H_2(g)$, 1.91 kmol $H_2O(g)$, $1.07 \times 10^{-4}$ kmol N(g), $2.56 \times 10^{-4}$ kmol NaOH(g) and $1.0 \times 10^{-8}$ kmol $H_2SO_4 \cdot 6.5H_2O$.

Figure 7:
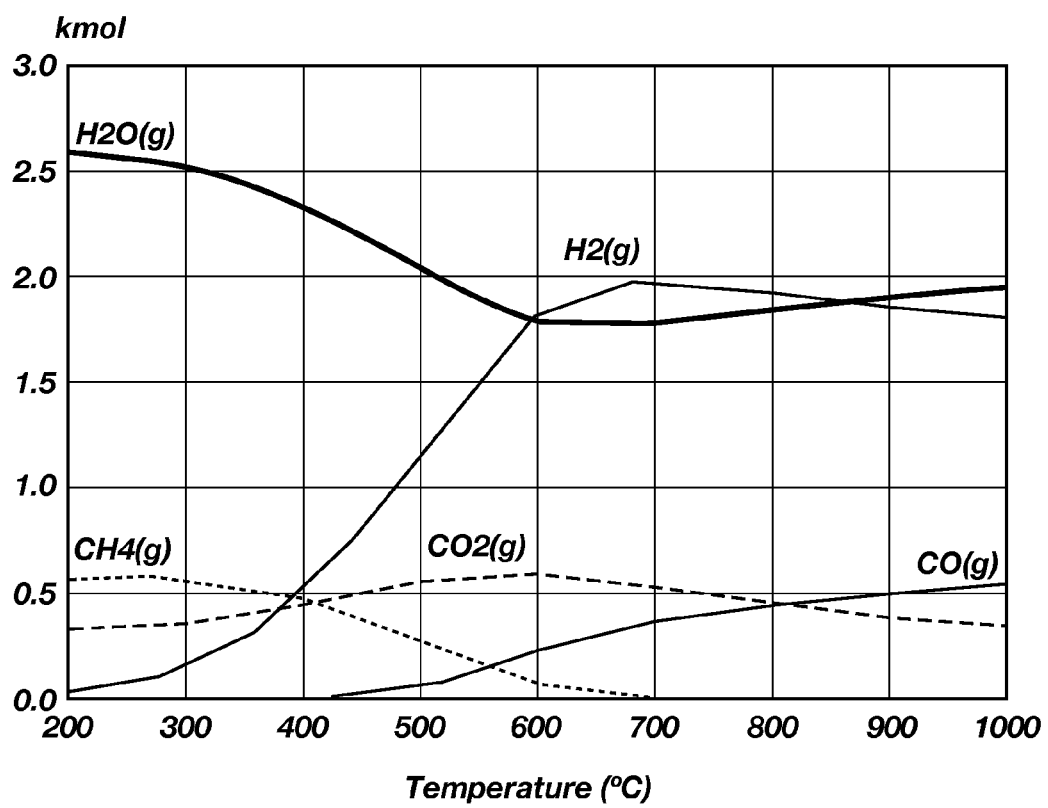
FIG. 7 is a graph representing an example of equilibrium conditions versus temperature of the second temperature zone in the molten metal reactor of the present invention.

The gases from the first zone 302 exit the molten alkaline metal compound 112 and enter the second zone 304. FIG. 7 illustrates the equilibrium conditions within the second zone 304. The second zone 304 may be maintained at a temperature of, for example, 845° C. At 845° C., the equilibrium conditions are $1.99 \times 10^{-4}$ $CH_4(g)$, 0.473 kmol CO(g), 0.433 kmol $CO_2$ (g), 1.89 kmol $H_2(g)$, 1.88 kmol $H_2O(g)$, $1 \times 10^{-9}$ kmol $H_2SO_4(g)$, $1.87 \times 10^{-5}$ kmol Na(g), and $6.09 \times 10^{-5}$ kmol NaOH(g).

Figure 8:
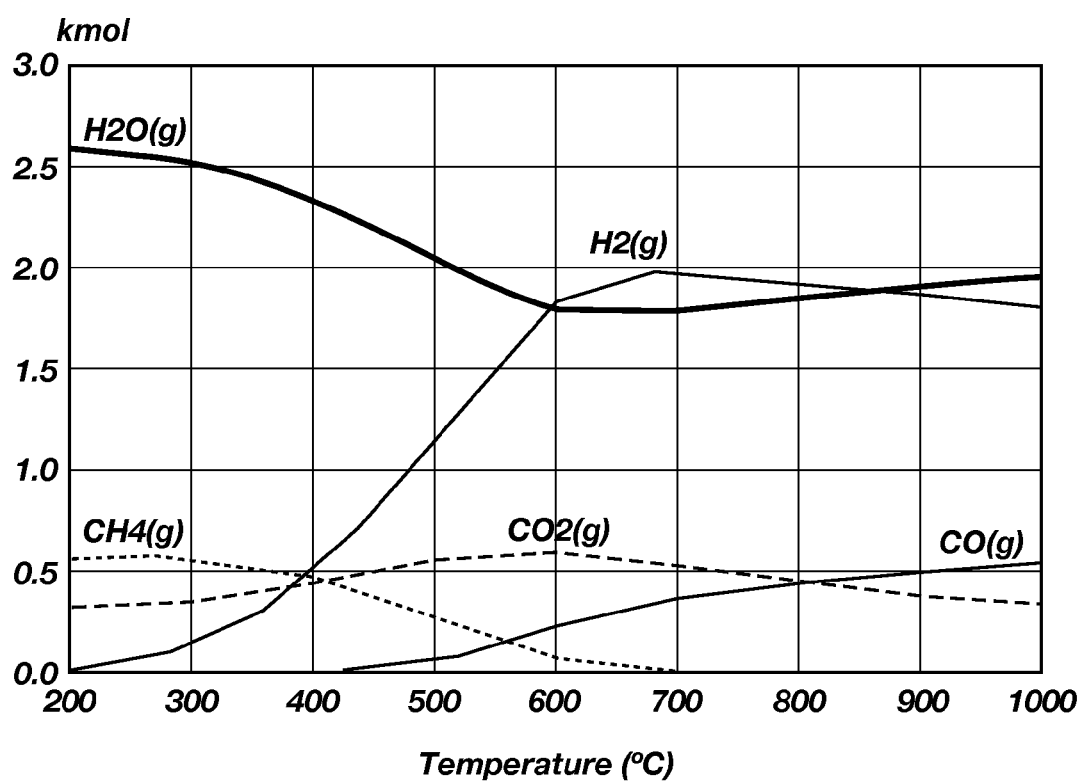
FIG. 8 is a graph representing an example of equilibrium conditions versus temperature of the third temperature zone in the molten metal reactor of the present invention.

The trace amounts of $H_2SO_4$, Na, and NaOH, will be trapped within the filter 118 in the second zone 304 while the $CH_4$, CO, $CO_2$, $H_2$, and $H_2O$ enter the third zone 306. FIG. 8 illustrates the equilibrium conditions within the third zone 306. In the third zone 306, the temperature is further decreased and water may be condensed out. The gases may undergo a further shift in composition based on the temperature within the third zone 306. The temperature of the third zone 306 will depend on the most heavily sought product in the gas product stream. For example, if hydrogen is the most valuable product, the temperature of third zone 306 may be approximately 680° C. when the hydrogen composition is the greatest, as illustrated in FIG. 8.

The molten molten metal reactor 100 of the present invention has several advantages over other molten reactors known in the art. For example, the baffles 116, 116' within the molten alkaline metal compound 112 increase the residence time of the carbon material to be converted without greatly increasing the size of the molten metal reactor 100 or the quantity of the molten alkaline metal compound 112. Additionally, the filter 118 and ion control screen 124 prevent the molten alkaline metal compound 112 from exiting the molten metal reactor 100 thus avoiding costly damage to pipes and systems used to process the filtered gas 206'.

Figure 9:
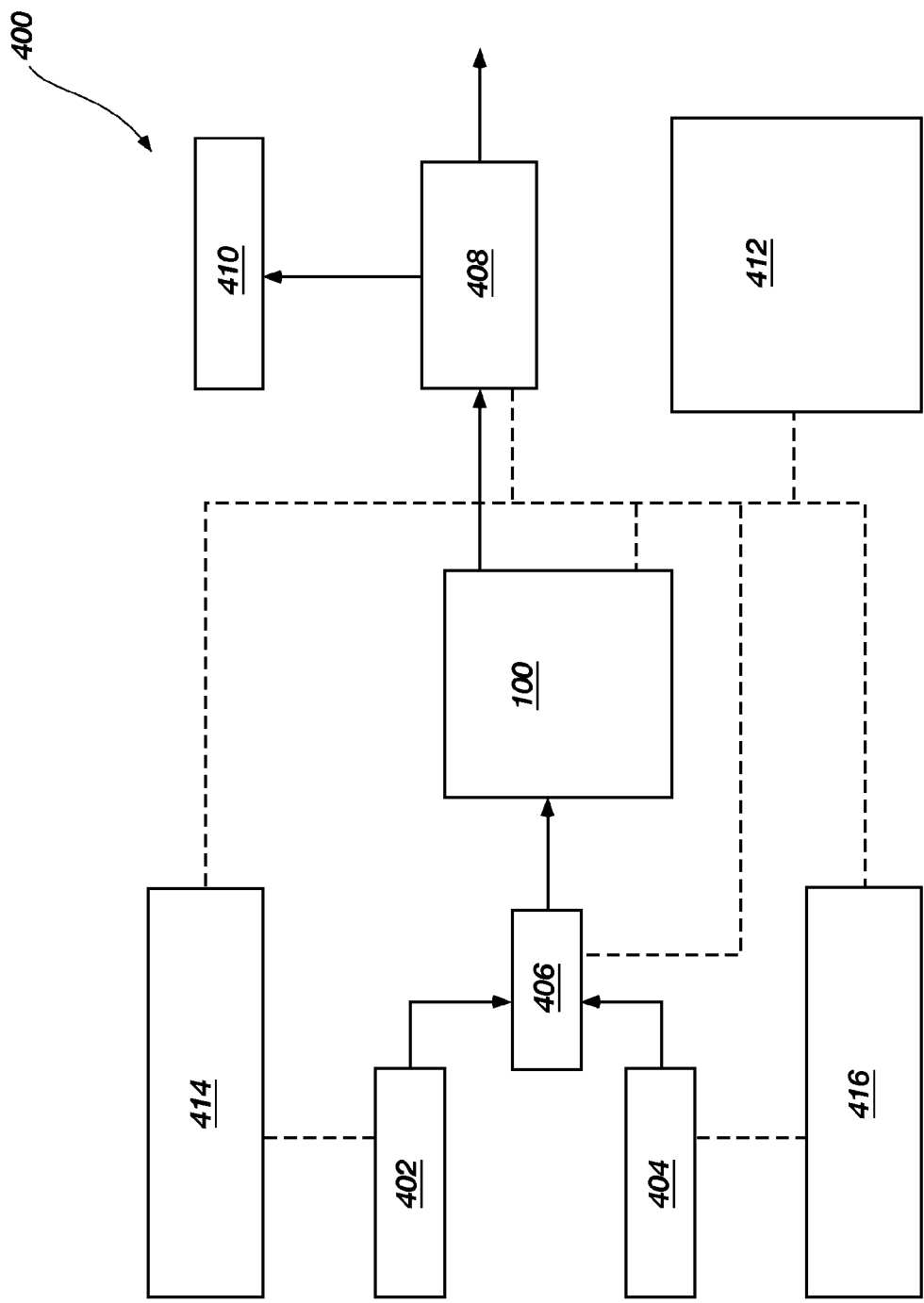
FIG. 9 is a schematic of a molten metal reactor of the present invention.

In further embodiments, the molten metal reactor 100 may be included in a system 400 as illustrated in FIG. 9. In the system 400, a water feed 402 and a carbon material feed 404 are fed to a mixer 406. The mixed streams are then fed into the molten metal reactor 100. The water feed 402 and the carbon feed 404 react within the molten metal reactor 100 to form a product stream 408 comprising hydrogen, carbon monoxide, and carbon dioxide gases. The gases may be sampled at 410 for analysis and control. The process 400 may be monitored by an HMI Monitor and process controls 412. The HMI Monitor and process controls 412 are capable of sending signals for flow and temperature controls 414 of the water feed 402 and also signals for flow and temperature controls 416 of the carbon material feed 404.

The invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method for converting a carbon material and steam into a gas comprising hydrogen, carbon monoxide and carbon dioxide, the method comprising:
   feeding a feed stream comprising a carbon material and steam into an interior crucible member;
   diffusing the feed stream from the interior crucible member to a molten alkaline metal compound contained between the interior crucible member and an exterior crucible member so as to form bubbles of the feed stream within the molten salt;
   forming a path for the bubbles to follow within the molten alkaline metal compound for increasing the residence time of the bubbles within the molten alkaline metal compound;
   reacting the bubbles within the molten alkaline metal compound forming a gas comprising carbon monoxide, carbon dioxide, and hydrogen; and
   removing the gas from the reactor.

2. The method of claim 1, further comprising filtering the gas so as to remove the molten alkaline metal compound from the gas.

3. The method of claim 1, further comprising separating the molten alkaline metal compound from the gas using an ion control screen device.

4. The method of claim 1, further comprising heating the molten alkaline metal compound with a heater adjacent to the exterior crucible member.

5. The method of claim 1, further comprising vaporizing the feed stream in the interior crucible member using heat from the molten alkaline metal compound.

6. The method of claim 1, wherein forming a path for the bubbles to follow within the molten alkaline metal compound for increasing the residence time of the bubbles within the molten alkaline metal compound comprises installing a first baffle and a third baffle extending from the surface of the interior crucible member toward the exterior crucible member and installing a second baffle extending from the exterior crucible member toward the interior crucible, the second baffle positioned between the first and third baffles so as to form a substantially serpentine path within the molten alkaline metal compound.

* * * * *

UNITED STATES PATENT AND TRADEMARK OFFICE
CERTIFICATE OF CORRECTION

| | | |
|---|---|---|
| PATENT NO. | : 8,309,049 B2 | Page 1 of 1 |
| APPLICATION NO. | : 12/581656 | |
| DATED | : November 13, 2012 | |
| INVENTOR(S) | : Dennis N. Bingham et al. | |

It is certified that error appears in the above-identified patent and that said Letters Patent is hereby corrected as shown below:

On the title page:
ITEM (54) Title of Invention      change "MOLTEN ALKALINE METAL" to
(line 4)      --MOLTEN METAL--

In the specification:
COLUMN 8, LINE 8,      change "molten molten metal" to --molten metal--

In the claims:
CLAIM 6, COLUMN 10, LINE 1,      change "from the surface" to --from a surface--
CLAIM 6, COLUMN 10, LINE 4,      change "interior crucible," to --interior crucible member,--

Signed and Sealed this
Twenty-first Day of April, 2015

Michelle K. Lee
*Director of the United States Patent and Trademark Office*

UNITED STATES PATENT AND TRADEMARK OFFICE
CERTIFICATE OF CORRECTION

PATENT NO. : 8,309,049 B2  
APPLICATION NO. : 12/581656  
DATED : November 13, 2012  
INVENTOR(S) : Dennis N. Bingham et al.

Page 1 of 1

It is certified that error appears in the above-identified patent and that said Letters Patent is hereby corrected as shown below:

On the title page:
Item (54) and in the Specification, Column 1, line 4,   change "MOLTEN ALKALINE METAL" to --MOLTEN METAL--

In the specification:
COLUMN 8, LINE 8,   change "molten molten metal" to --molten metal--

In the claims:
CLAIM 6, COLUMN 10, LINE 1,   change "from the surface" to --from a surface--
CLAIM 6, COLUMN 10, LINE 4,   change "interior crucible," to --interior crucible member,--

This certificate supersedes the Certificate of Correction issued April 21, 2015.

Signed and Sealed this
Thirtieth Day of June, 2015

Michelle K. Lee
*Director of the United States Patent and Trademark Office*